(No Model.)
A. G. HILL.
CARRIAGE AXLE.
No. 424,203. Patented Mar. 25, 1890.
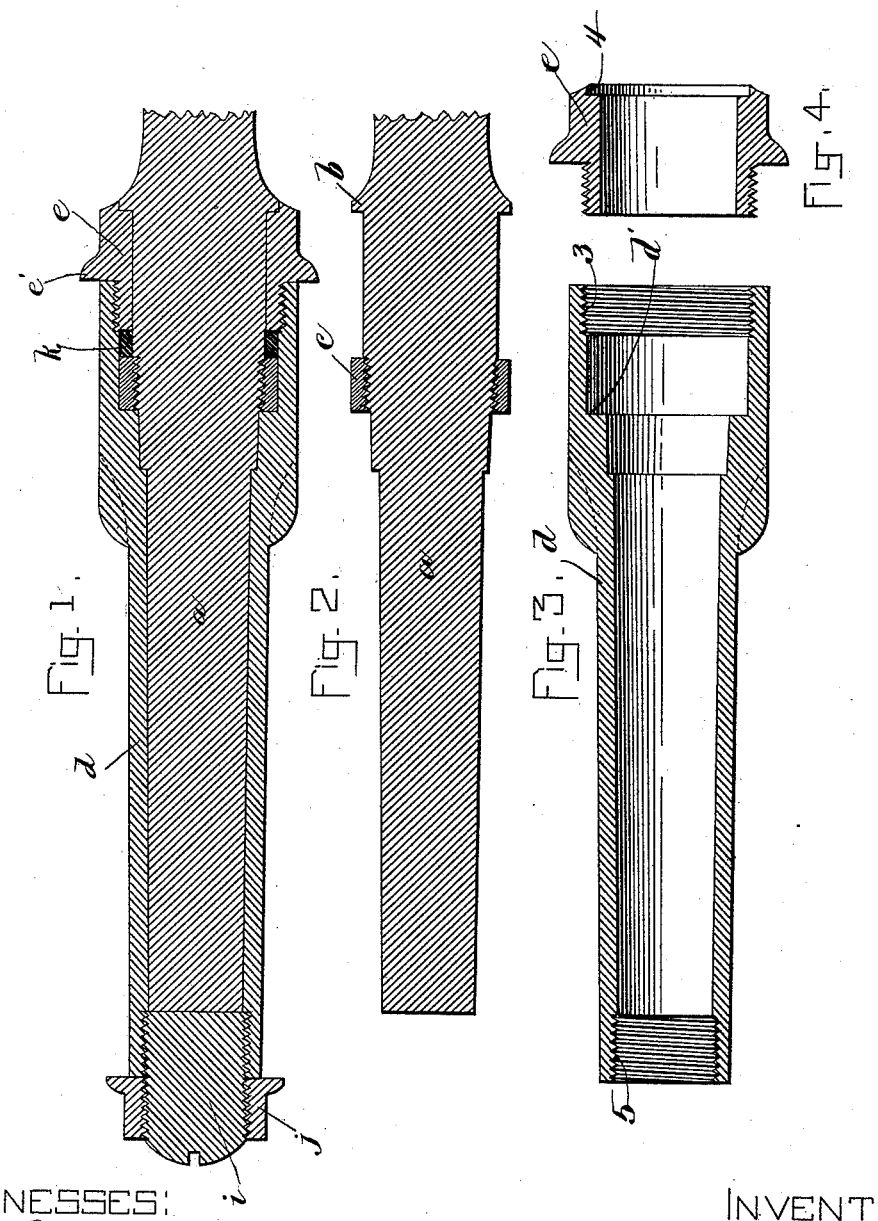
WITNESSES:
K. E. Brown
W. C. Ramsay
INVENTOR:
A. G. Hill
by Knight Brown Quigley
Attys.

UNITED STATES PATENT OFFICE.

ASA G. HILL, OF STONEHAM, MASSACHUSETTS.

CARRIAGE-AXLE.

SPECIFICATION forming part of Letters Patent No. 424,203, dated March 25, 1890.

Application filed January 11, 1890. Serial No. 336,675. (No model.)

*To all whom it may concern:*

Be it known that I, ASA G. HILL, of Stoneham, in the county of Middlesex and State of Massachusetts, have invented certain new and useful Improvements in Carriage-Axles, of which the following is a specification.

This invention has for its object to provide improved means for securing hubs to axles in such a manner as to take up all the endwise motion of the hub upon the axle; and it consists in the improved construction which I will now proceed to describe and claim.

In the accompanying drawings, forming a part of this specification, Figure 1 represents a longitudinal section of one arm of a carriage-axle, the axle-box thereon, and means embodying my invention for securing the box to the axle. Fig. 2 represents a longitudinal section of the axle-arm, the other parts shown in Fig. 1 being removed. Fig. 3 represents a longitudinal section of the box removed from the axle. Fig. 4 represents a longitudinal section of the nut that is engaged with the axle-arm and secures the box thereto.

The same letters and figures of reference indicate the same parts in all the drawings.

In the drawings, $a$ represents one of the arms or journal portions of a carriage-axle. $b$ represents a shoulder formed upon said axle at the inner end of the portion thereof that enters the hub, said shoulder being outside of the hub when the latter is in place on the axle. $c$ represents another shoulder, which is formed by screwing an internally-threaded ring upon a threaded portion of the axle between the shoulder $c$, being therefore removable from the axle.

$d$ represents the box, which is inserted in and secured to the hub in the usual way, and is formed to receive and rotate upon the axle-arm $a$. The box is provided with an enlargement or chamber $d'$, which is formed to receive the shoulder $c$ on the axle, the inner end of said enlargement or chamber bearing against the outer edge of the shoulder $c$, as shown in Fig. 1. The enlargement or chamber $d'$ is internally threaded at 3, said threaded portion projecting beyond the shoulder $c$, and being located between the shoulders $b$ and $c$, as shown in Fig. 1.

$e$ represents a nut or collar, which has a central bore or cavity formed to fit the periphery of the axle between the shoulders $b$ and $c$, the said nut or collar being adapted to rotate on the axle between said shoulders. The nut or cavity $e$ is externally screw-threaded at one end, its threaded portion being formed to engage the internal screw-thread 3 in the enlargement of the box $d$. The other end of the nut or collar $e$ is provided with a recess 4, formed to receive the shoulder $b$ of the axle. The outer end of the box $d$ is internally screw-threaded at 5, and the box is of such length that when it is in place on the axle and bearing upon the shoulder $c$ the internally-threaded portion 5 projects outside of the outer end of the axle, as shown in Fig. 1.

$i$ represents a screw-threaded plug formed to engage the internal thread 5, said plug being screwed into the outer end of the box until it comes to a bearing on the outer end of the axle.

$j$ represents a check-nut screwed upon the plug $i$ and bearing upon the outer end of the box $d$ to lock or prevent the accidental rotation of the plug $i$.

$k$ represents a washer of leather or other compressible material interposed between the shoulder $c$ and the nut or collar $e$. The nut or collar $e$ and the washer $k$ are placed upon the axle before the collar $c$ is applied thereto. After the collar $c$ is screwed to place the box $d$, which is understood to be secured, as usual, to the hub, is placed upon the axle, and its internal screw-thread 3 is engaged by the external screw-thread of the nut or collar $e$, said nut or collar being then rotated until the box is drawn inwardly and its inner end comes to a bearing on the shoulder $e'$, formed on the nut or collar $e$. The plug $i$ is then screwed into the outer end of the box $d$ until it comes to a bearing upon the outer end of the axle, and the check-nut $j$ is then turned to a bearing on the outer end of the box $d$. It will be seen that the nut or collar $e$ by its rotation draws the box to a bearing upon the shoulder $c$, said nut or collar being held in place and prevented from moving endwise upon the axle in either direction by the shoulders $b\ c$. It will also be seen that the screw-plug $i$, with its check-nut $j$, said plug and nut bearing, respectively, upon the axle and box, as described, not only co-operate with the nut $e$ and shoulders $b\ c$ in preventing end shake of the box, but also prevent the escape of oil from the outer end of the box, the inner end of the plug and its screw-threaded periphery forming a tight joint in the box, while the check-nut keeps the plug in place and prevents its accidental unscrewing.

I am aware that an axle has been heretofore made having an integral shoulder $b$, an internally-threaded detachable shoulder $c$, screwed upon the periphery of the axle, and a collar $e$, mounted to rotate freely on the axle between the shoulders $b\ c$ and externally threaded to engage the internally-threaded inner end of the axle-box, and I do not, therefore, claim such construction as my invention. I am not aware, however, that an externally-threaded plug $i$, to engage the internally-threaded outer end of the box, and the check-nut $j$, screwed on said plug and bearing on the outer end of the box, have ever been employed in combination with the axle having the said shoulders $b\ c$, the collar $e$, and the box internally threaded at both ends.

I claim—

The combination of the axle $a$, having an integral shoulder $b$ and the detachable shoulder $c$, the externally-threaded nut or collar $e$, adapted to rotate on the axle between the shoulders $b$ and $c$, the axle-box internally screw-threaded at both ends, the screw-thread 3 at one end being adapted to engage the external thread of the nut $e$, while the screw-thread 5 at the other end projects beyond the outer end of the axle, the screw-threaded plug $i$, adapted to engage the thread 5 and bear upon the outer end of the axle, and the check-nut $j$, engaged with the plug $i$ and bearing on the outer end of the box, all arranged and operating substantially as described.

In testimony whereof I have signed my name to this specification, in the presence of two subscribing witnesses, this 7th day of January, A. D. 1890.

ASA G. HILL.

Witnesses:
C. F. BROWN,
A. D. HARRISON.